US011477845B2

(12) United States Patent
Wittberg et al.

(10) Patent No.: US 11,477,845 B2
(45) Date of Patent: *Oct. 18, 2022

(54) NETWORK NODE AND METHODS THEREIN FOR PACKET DATA CONVERGENCE PROTOCOL (PDCP) REORDERING

(71) Applicant: Telefonaktiebolaget LM Ericsson (publ), Stockholm (SE)

(72) Inventors: Mikael Wittberg, Uppsala (SE); Gunnar Bergquist, Kista (SE); Hans Hannu, Luleå (SE); Ingemar Johansson, Luleå (SE); Anders Jonsson, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 124 days.

This patent is subject to a terminal disclaimer.

(21) Appl. No.: 16/907,750

(22) Filed: Jun. 22, 2020

(65) Prior Publication Data
US 2020/0351983 A1 Nov. 5, 2020

Related U.S. Application Data

(63) Continuation of application No. 15/781,556, filed as application No. PCT/SE2018/050252 on Mar. 15, 2018, now Pat. No. 10,736,174.
(Continued)

(51) Int. Cl.
*H04W 80/08* (2009.01)
*H04L 47/193* (2022.01)
(Continued)

(52) U.S. Cl.
CPC .......... *H04W 80/08* (2013.01); *H04L 47/193* (2013.01); *H04L 47/283* (2013.01); *H04L 47/34* (2013.01); *H04W 8/04* (2013.01); *H04W 28/12* (2013.01)

(58) Field of Classification Search
CPC ..... H04L 1/1841; H04L 47/564; H04L 47/14; H04L 47/193; H04L 47/283; H04L 47/34; H04W 80/08; H04W 28/12; H04W 24/02
See application file for complete search history.

(56) References Cited

U.S. PATENT DOCUMENTS

| 8,588,175 B2 | 11/2013 | Kim et al. |
| 9,585,048 B2 | 2/2017 | Ozturk et al. |

(Continued)

FOREIGN PATENT DOCUMENTS

| CN | 101529816 A | 9/2009 |
| CN | 101689922 A | 3/2010 |

(Continued)

OTHER PUBLICATIONS

First Examination Report dated Oct. 7, 2021 for Indian Patent Application No. 201947047713, 6 pages.
(Continued)

*Primary Examiner* — Vinncelas Louis
(74) *Attorney, Agent, or Firm* — Sage Patent Group

(57) ABSTRACT

Embodiments include methods for handling data units in a communication protocol layer (e.g., PDCP) of a network node for a wireless communications network. Such methods include receiving, from a lower protocol layer, one or more first data units with corresponding first sequence numbers. Such methods include, upon expiration of a first timer, forwarding the first data units to a higher protocol layer without receiving one or more second data units, from the lower protocol layer, with corresponding second sequence
(Continued)

Method performed by network node 606, 608 numbers that are lower than the first sequence numbers. Such methods include forwarding, to the higher protocol layer, any of the second data units that were received from the lower protocol layer during a second time period after expiration of the first timer. Other embodiments include network nodes (e.g., base stations, UEs) configured to perform such methods, as well as computer-readable media containing instructions that embody such methods.

21 Claims, 10 Drawing Sheets

Related U.S. Application Data

(60) Provisional application No. 62/491,291, filed on Apr. 28, 2017.

(51) Int. Cl.
  *H04L 47/283* (2022.01)
  *H04L 47/34* (2022.01)
  *H04W 28/12* (2009.01)
  *H04W 8/04* (2009.01)

(56) References Cited

U.S. PATENT DOCUMENTS

| | | | |
|---|---|---|---|
| 2009/0168723 | A1 | 7/2009 | Meylan |
| 2010/0135303 | A1 | 6/2010 | Umesh et al. |
| 2011/0188377 | A1 | 8/2011 | Kim et al. |
| 2014/0301188 | A1 | 10/2014 | Koskinen |
| 2015/0117357 | A1 | 4/2015 | Ozturk et al. |
| 2016/0164793 | A1* | 6/2016 | Basu Mallick ....... H04L 47/564 370/235 |
| 2017/0064707 | A1 | 3/2017 | Xiao et al. |
| 2017/0085492 | A1 | 3/2017 | Xiao et al. |
| 2017/0134123 | A1 | 5/2017 | Ozturk et al. |
| 2017/0367017 | A9* | 12/2017 | Meylan ................ H04L 1/1841 |

FOREIGN PATENT DOCUMENTS

| | | |
|---|---|---|
| CN | 105723668 A | 6/2016 |
| EP | 3063909 A1 | 9/2016 |
| RU | 2408994 C1 | 1/2011 |
| WO | 2009070576 A2 | 6/2009 |
| WO | 2015113497 A1 | 8/2015 |
| WO | 2015139557 A1 | 9/2015 |

OTHER PUBLICATIONS

ISO/IEC 2382-1:1993, Information technology—Vocabulary—Part 1: Fundamental terms, Nov. 1993 (definitions of "data" and "signal").
Cheng, Y., et al., "RACK: a time-based fast loss detection algorithm for TCP draft-cheng-tcpm-rack-01", TCP Maintenance Working Group; Google, Inc., Jul. 6, 2016, pp. 1-14.
Cheng, Y., et al., "RACK: a time-based fast loss detection algorithm for TCP draft-ietf-tcpm-rack-03", TCP Maintenance Working Group; Google, Inc., Mar. 5, 2018, pp. 1-25.
"3GPP TS 36.322 version 13.3.0"; Evolved Universal Terrestrial Radio Access (E-UTRA); Radio Link Control (RLC) protocol specification (Release 13), Apr. 2017, pp. 1-48.
Report on [86#30][LTE/DC] Implementation of PDCP reordering function in PDCP specification (Samsung), Aug. 18-22, 2014, pp. 1-10.
"3GPP TS 36.323 V14.2.0 (Mar. 2017)", 3rd Generation Partnership Project; Technical Specification Group Radio Access Network; Evolved Universal Terrestrial Radio Access (E-UTRA); Packet Data Convergence Protocol (PDCP) specification (Release 14), Mar. 2017, pp. 1-43.
"Discussion on PDCP reordering issue for small cell", 3GPP TSG-RAN2 Meeting #85; R2-140115; Prague, Czech, Jan. 10-14, 2014, pp. 1-6.
"RLC Operation Modes", 3GPP TSG-RAN2 Meeting #97; R2-1701200; Athens, Greece, Feb. 13-17, 2017, pp. 1-3.
First Chinese Office Action for Chinese Patent Application No. CN 201880028503.6 dated Jun. 6, 2022, 7 pages (including English translation).
Infineon, RAN2, 3GPP TSG RAN WG2 Meeting #62bis, R2-083231, "Interactions Between RRC-PDCP-RLC in Case of a Handover", Warsaw, Poland, Jun. 30-Jul. 4, 2008, 10 pages.

* cited by examiner

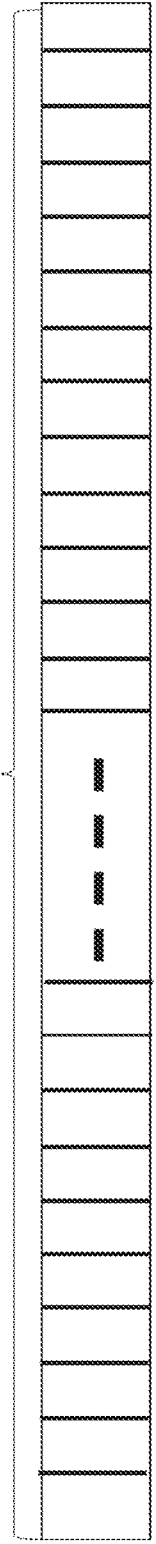

Figure 3A

Large reordering window (using 18 bits SN gives 131072 entries if half of window space is used)

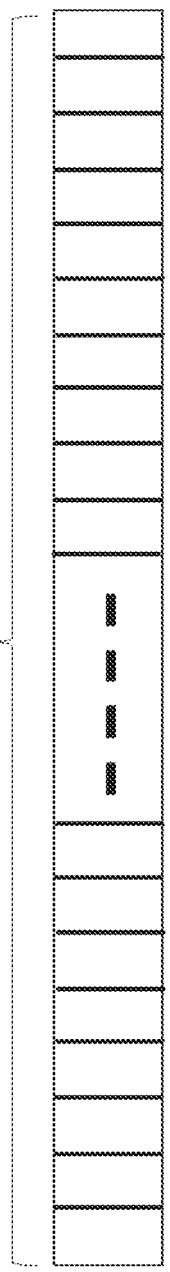

Figure 3B

Reordering window can be shorter when using t-Reordering timer, but depends on the length of the timer

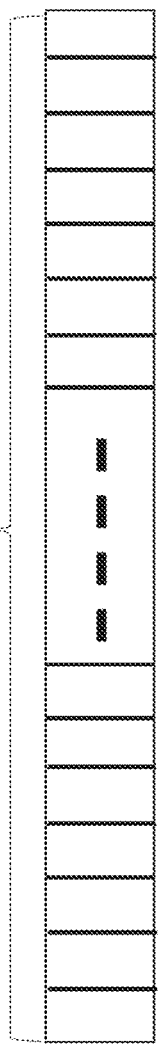

Figure 3C t-Reordering timer, can be even shorter if we allow late received packets to be forwarded to higher layers (if we would discard late packets the t-Reordering timer would normally have to be longer)

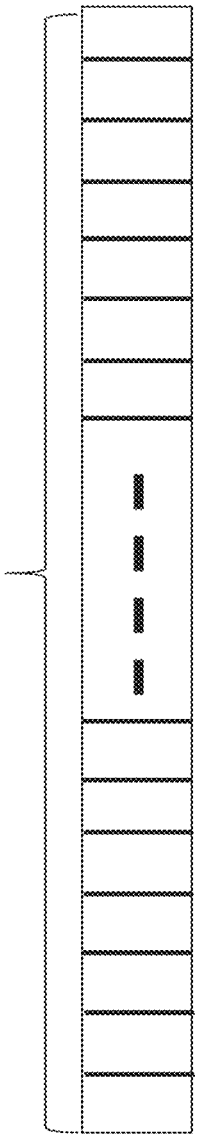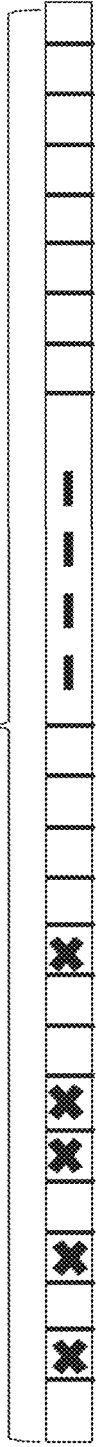
Figure 4

| Throughput (Gbps) | Number of packets per ms (1500 bytes packets) | 5 | 10 | 15 | 20 | 40 | 60 | 80 | 120 |
|---|---|---|---|---|---|---|---|---|---|
| 0,01 | 0,8 | 4,2 | 8,3 | 12,5 | 16,7 | 33,3 | 50,0 | 66,7 | 100,0 |
| 0,1 | 9 | 45 | 90 | 135 | 180 | 360 | 540 | 720 | 1080 |
| 0,5 | 42 | 210 | 420 | 630 | 840 | 1680 | 2520 | 3360 | 5040 |
| 1 | 84 | 420 | 840 | 1260 | 1680 | 3360 | 5040 | 6720 | 10080 |
| 2 | 167 | 835 | 1670 | 2505 | 3340 | 6680 | 10020 | 13360 | 20040 |
| 3 | 250 | 1250 | 2500 | 3750 | 5000 | 10000 | 15000 | 20000 | 30000 |
| 4 | 334 | 1670 | 3340 | 5010 | 6680 | 13360 | 20040 | 26720 | 40080 |
| 5 | 417 | 2085 | 4170 | 6255 | 8340 | 16680 | 25020 | 33360 | 50040 |
| 10 | 834 | 4170 | 8340 | 12510 | 16680 | 33360 | 50040 | 66720 | 100080 |
| 15 | 1250 | 6250 | 12500 | 18750 | 25000 | 50000 | 75000 | 100000 | 150000 |
| 20 | 1667 | 8335 | 16670 | 25005 | 33340 | 66680 | 100020 | 133360 | 200040 |
| 30 | 2500 | 12500 | 25000 | 37500 | 50000 | 100000 | 150000 | 200000 | 300000 |

Figure 5

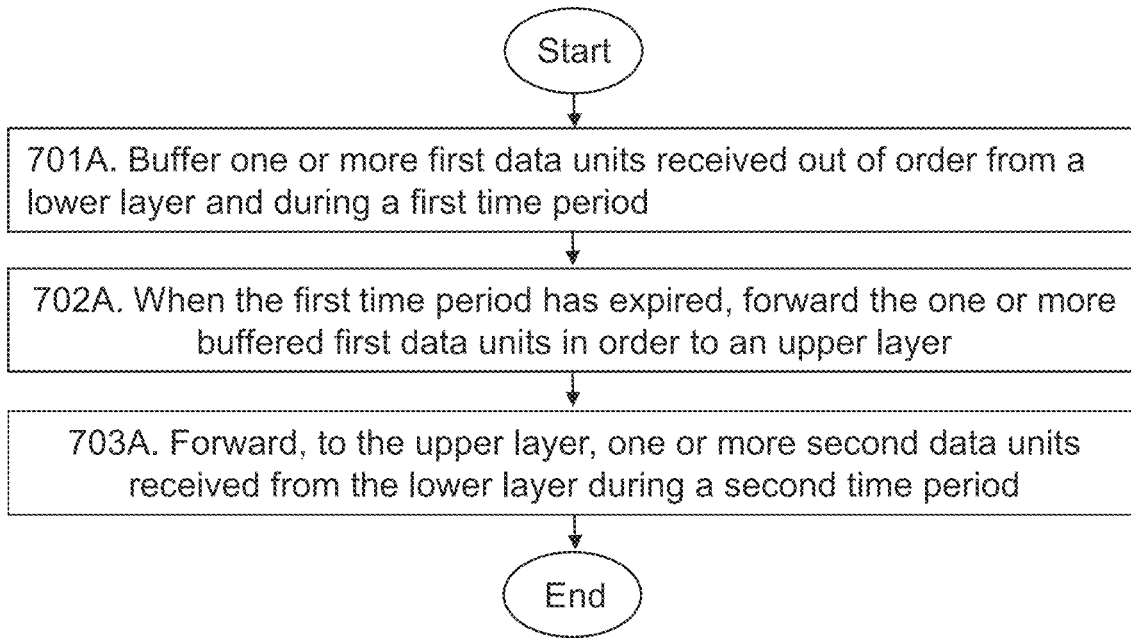
Figure 7A Method performed by network node 606, 608
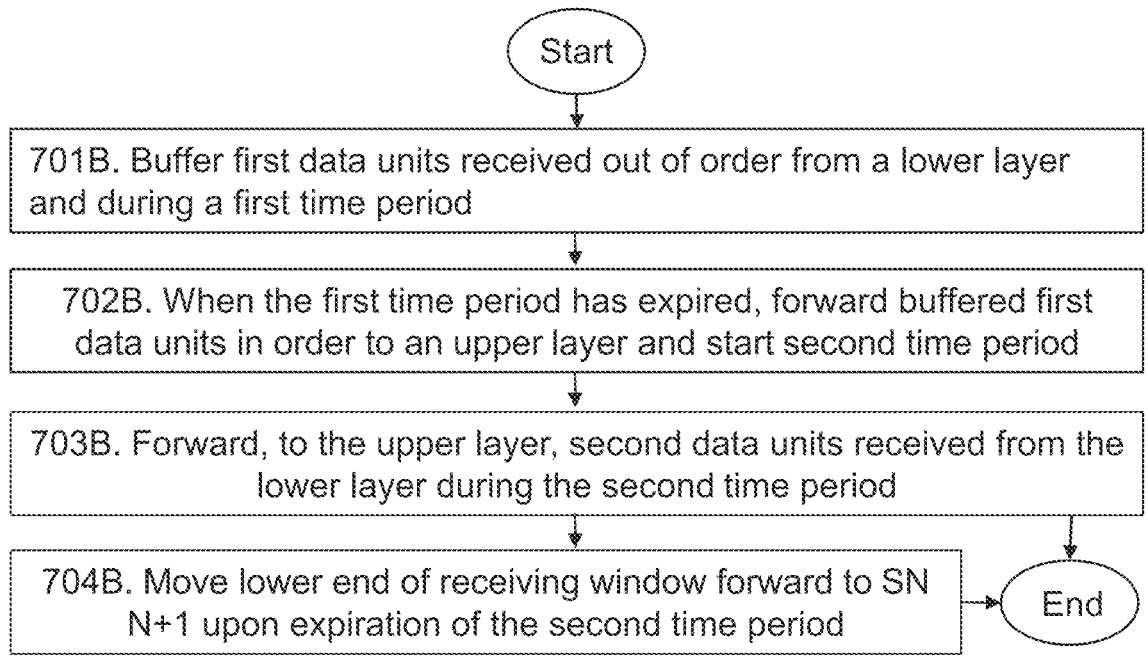
Figure 7B Method performed by network node 606, 608

NETWORK NODE AND METHODS THEREIN FOR PACKET DATA CONVERGENCE PROTOCOL (PDCP) REORDERING

CROSS-REFERENCE TO RELATED APPLICATIONS

This application is a continuation of, and claims the benefit of priority from, U.S. patent application Ser. No. 15/781,556 filed on Jun. 5, 2018, which is a U.S. national-stage application claiming priority to international application PCT/SE2018/050252 filed on Mar. 15, 2018, which claims priority to U.S. Provisional Application No. 62/491,291 filed on Apr. 28, 2017. The entire disclosures of the above-mentioned applications are incorporated herein by reference for all purposes.

TECHNICAL FIELD

Embodiments herein relate to a network node, and to methods therein. Especially, embodiments herein relate to Packet Data Convergence Protocol (PDCP) reordering.

BACKGROUND

Communication devices such as terminals or wireless devices are also known as e.g. User Equipments (UEs), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. an "eNB", an "eNodeB", a "NodeB", a "B node", or a Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

A Universal Mobile Telecommunications System (UMTS) is a third generation (3G) telecommunication network, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a Radio Network Controller (RNC) or a Base Station Controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In the 3GPP LTE, base stations, which may be referred to as eNodeBs or even eNBs, may be directly connected to one or more core networks.

The 3GPP LTE radio access standard has been written in order to support high bitrates and low latency both for uplink and downlink traffic. All data transmission is in LTE controlled by the radio base station.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

In a 3GPP LTE communications network, a Radio Link Control (RLC) protocol, such as the RLC protocol according to section 5.1.3.2 "Receive operations" of the 3GPP TS 36.322 standard, always performs reordering to guarantee in-sequence order delivery of data units to a Packet Data Convergence Protocol (PDCP) and further on from there. Thus, the reordering functionality is performed to reorder data units received out of order to guarantee that the received data units are delivered in a correct order. The RLC is a layer 2 protocol used by LTE on the air interface. Further, the RLC is located on top of the 3GPP MAC layer and below the PDCP layer. The PDCP layer is a data link layer or a data forwarding layer. The PDCP protocol in LTE, e.g. the PDCP protocol according to section 5.1.2.1.4 "Procedures for DRBs mapped on RLC AM and for LWA bearers when the reordering function is use" of the 3GPP TS 36.323 standard, does also have a function to perform reordering of its Protocol Data Units (PDUs), which is used at times when the RLC does not manage to guarantee in-sequence delivery, e.g. during times when the RLC is re-established, e.g. for handover etc., and when data is sent using two parallel RLC protocols and different physical layer adaptation functions. This is sometimes referred to as dual connectivity.

The 3GPP New Radio (NR) communications network, e.g. the 5G communications network, aims at providing larger bandwidths at higher frequencies with more challenging radio coverage, and is expected to have an increased dependency on PDCP anchored dual connectivity and/or multi-connectivity.

As a result, it is agreed to require from the PDCP to always provide the reordering function, i.e. not only at times when lower layers are re-established or configured for dual connectivity. The complexity of the RLC is decreased such that it does not need to perform reordering but may deliver without delay directly after Service Data Unit (SDU) assembly. An SDU is a unit of data that has been passed down from an upper layer to a lower layer. The SDU has not yet been encapsulated into a Protocol Data Unit (PDU) by the lower layer. In other words, the SDU of the lower layer is the input to the protocol of the lower layer and the PDU of the lower layer is the output from the protocol of the lower layer. Thus, the input to a protocol of a layer may be referred to as the SDU and the output of the protocol of the layer may be referred to as the PDU. Further, the SDU at any given layer (n) is the PDU of the layer above (n+1). In effect the SDU is the payload of a given PDU. The layer (n−1) adds headers or footers, or both, to the SDU when forming the PDU. In this disclosure the terms the RLC SDU and the PDCP PDU are interpreted as being equal and used interchangeably. It follows that the PDCP will meet new challenges to continuously execute reordering, at least at occasions when in sequence delivery to one or more layers above the PDCP is needed. The layer above the PDCP layer may be a data link layer, a network layer, a transport layer, a session layer, a presentation layer or an application layer just to give some examples.

The reordering function in the LTE PDCP is using a t-Reordering timer to limit the time to wait for missing PDCP PDUs. If one or more out-of-sequence PDCP PDUs are received by the PDCP layer, from lower layers, e.g. from the RLC layer, i.e. there is one or more missing PDCP PDUs, the reordering function in LTE PDCP will do the following:

1. The one or more out-of-sequence PDCP PDUs are buffered and not immediately forwarded.
2. The t-Reordering timer is started. Note that if t-Reordering timer is already running, it shall neither be started again nor additionally be started for each of the one or more missing PDUs, i.e. only one t-Reordering timer is running per PDCP entity at any given time. The PDCP entity may be some piece of software running a separate instance of a full PDCP protocol between a network node, such as an eNB or a gNB, and a network node, such as UE, for a specific, so called, radio bearer. There are different bearers in LTE, signalling radio bearers aka SRB and data radio bearers aka DRB. There is one entity for each such bearer, thus also a timer for each such bearer.
3. If more PDCP PDUs, e.g. some of the one or more missing PDCP PDUs, are received out-of-sequence before t-Reordering expire, they are buffered and not immediately forwarded to an upper layer.
4. If the one or more missing PDCP PDUs are all received before the t-Reordering timer expire, they are immediately forwarded in-sequence to the upper layer, followed by an in-sequence delivery of buffered PDUs to the upper layer.
5. But if instead the t-Reordering timer expires before the one or more missing PDUs are all received, there is no more waiting but instead only the buffered PDCP PDUs will be forwarded to upper layers. If by any chance any of the one or more missing PDCP PDUs is received after the t-Reordering timer has expired, it will arrive too late and will be discarded.
6. The lower end of the reception window will be advanced to match the latest PDCP PDU that has been forwarded to upper layers.

The PDCP reordering functionality provides a robust way to ensure in-order delivery for PDCP PDUs that are received within a certain time period, but at the cost of setting a limit for how late PDUs, e.g. packets, may arrive.

SUMMARY

An object addressed by embodiments herein is how to improve performance in a wireless communications network.

An aim of some embodiments disclosed herein is to overcome or mitigate at least some of the drawbacks with the prior art.

According to an aspect of embodiments herein, the object is achieved by a method performed by a network node, such as a Radio Network Node or a communications device, for PDCP reordering. The network node is operating in a wireless communications network.

The network node buffers in order one or more first data units received out of order by a PDCP layer. The one or more first data units are received from a lower layer during a first time period. The lower layer is a layer below the PDCP layer. The upper layer is a layer above the PDCP layer.

When the first time period has expired, the network node forwards the one or more buffered first data units in order to an upper layer and starts a second time period.

Further, the network node forwards, to the upper layer and in any order, one or more second data units received from the lower layer during the second time period. Thereby, the one or more second data units arriving too late to the PDCP layer to be buffered in order are forwarded to the upper layer in time for a reordering functionality of the upper layer.

The network node buffering in order one or more first data units, means that the one or more first data units are buffered in sequence number order.

In some embodiments, the one or more second data units are immediately forwarded to the upper layer, e.g. they are forwarded directly after reception. The first and second time periods may be consecutive time periods. Further, the first time period may be shorter that the second timer period. In other words, the network node may be waiting for the shorter first time period for missing packets to deliver these in order without waiting too long, and then may be waiting till a longer second time period for any late still missing packets and still deliver these to upper layers before advancing a lower edge of a receive window. By the expression "advancing the lower edge of the receive window" when used herein is meant that a lower end of the receive window is moved forward, i.e. that the lower end of the receive window is moved to a higher sequence number. The purpose of "advancing the lower edge of the receiving window" is to ensure that received data units that are too old are discarded by the receiver entity. The receive window is sometimes in this disclosure referred to as a receiving window and it should be understood that the terms may be used interchangeably. The receiving window comprises the first and second time periods.

According to another aspect of embodiments herein, the object is achieved by a network node, such as a Radio Network Node or a communications device, for PDCP reordering. The network node is configured to operate in a wireless communications network.

The network node is configured to buffer in order one or more first data units received out of order by a PDCP layer. The one or more first data units are received from a lower layer and during a first time period. The lower layer is a layer below the PDCP layer. The upper layer is a layer above the PDCP layer.

Further, the network node is configured to forward the one or more buffered first data units in order to an upper layer and to start a second time period, when the first time period has expired.

Furthermore, the network node is configured to forward, to the upper layer and in any order, one or more second data units received from the lower layer during the second time period. Thereby, the one or more second data units arriving too late to the PDCP layer to be buffered in order is forwarded to the upper layer in time for a reordering functionality of the upper layer.

In some embodiments, the network node is configured to immediately forward, to the upper layer, the one or more second data units. In other words, the network node may be configured to forward, to the upper layer, the one or more second data units directly after reception. The first and second time periods may be consecutive time periods. Further, the first time period may be shorter that the second timer period. In other words, the network node may be configured to wait for the shorter first time period for missing packets to deliver these in order without waiting too long, and then may be configured to wait till a longer second time period for any late still missing packets and still deliver these to upper layers before advancing lower edge of receive window.

According to another aspect of embodiments herein, the object is achieved by a computer program, comprising instructions which, when executed on at least one processor, causes the at least one processor to carry out the method performed by the network node.

According to another aspect of embodiments herein, the object is achieved by a carrier comprising the computer program, wherein the carrier is one of an electronic signal, an optical signal, a radio signal or a computer readable storage medium.

An advantage with some embodiments disclosed herein is that the requirement of in-order delivery is decoupled from the advancement of the lower edge of the receiving window, which means that it is possible to use two different time periods, e.g. first and second time periods, for the forwarding of received PDCP SDUs:

A first time period, e.g. a shorter time period, T1 in which in-order delivery is ensured for SDUs forwarded to upper layers.

A second time period, e.g. a longer time period, T2 for which SDUs may be forwarded to upper layers but where they may be forwarded out-of-order, and duplicate detection may optionally be supported during this second time period. Lower layers PDUs received by the PDCP that are older than the second time period, will be discarded because they will arrive outside the receiving window. It is important to discard these late PDUs because the receiver must keep track of when the sequence number space is wrapping to zero, e.g. a Hyper Frame Number (HFN) is incremented, to avoid the sender and the receiver to be out-of-sync with regards to the HFN number. By the terms receiver and sender when used herein is meant either the case when the UE is the sender and the gNB/eNB is the receiver (uplink traffic), or the case when the UE is the receiver and the gNB/eNB is the sender (downlink traffic).

BRIEF DESCRIPTION OF DRAWINGS

Examples of embodiments herein will be described in more detail with reference to attached drawings in which:

FIGS. 3A-3C show three examples that schematically illustrate how the length of the reordering window depends on the t-reordering timer;

FIG. 4 schematically illustrates window to keep track of received PDUs while the t-WaitForLatePDUs timer is running;

FIG. 5 schematically illustrates that less memory is needed in the PDCP receiver if the t-Reordering timer may be set to a small value;

FIGS. 7A and 7B are flowcharts depicting embodiments of a method performed by a network node;

DETAILED DESCRIPTION

As part of developing embodiments herein, some drawbacks with the state of the art communications networks will first be identified and discussed.

As previously mentioned, the prior art PDCP reordering functionality provides a robust way to ensure in-order delivery for PDCP PDUs that are received within a certain time period, but at the cost of setting a limit for how late PDUs, e.g. packets, may arrive.

Figure 1:
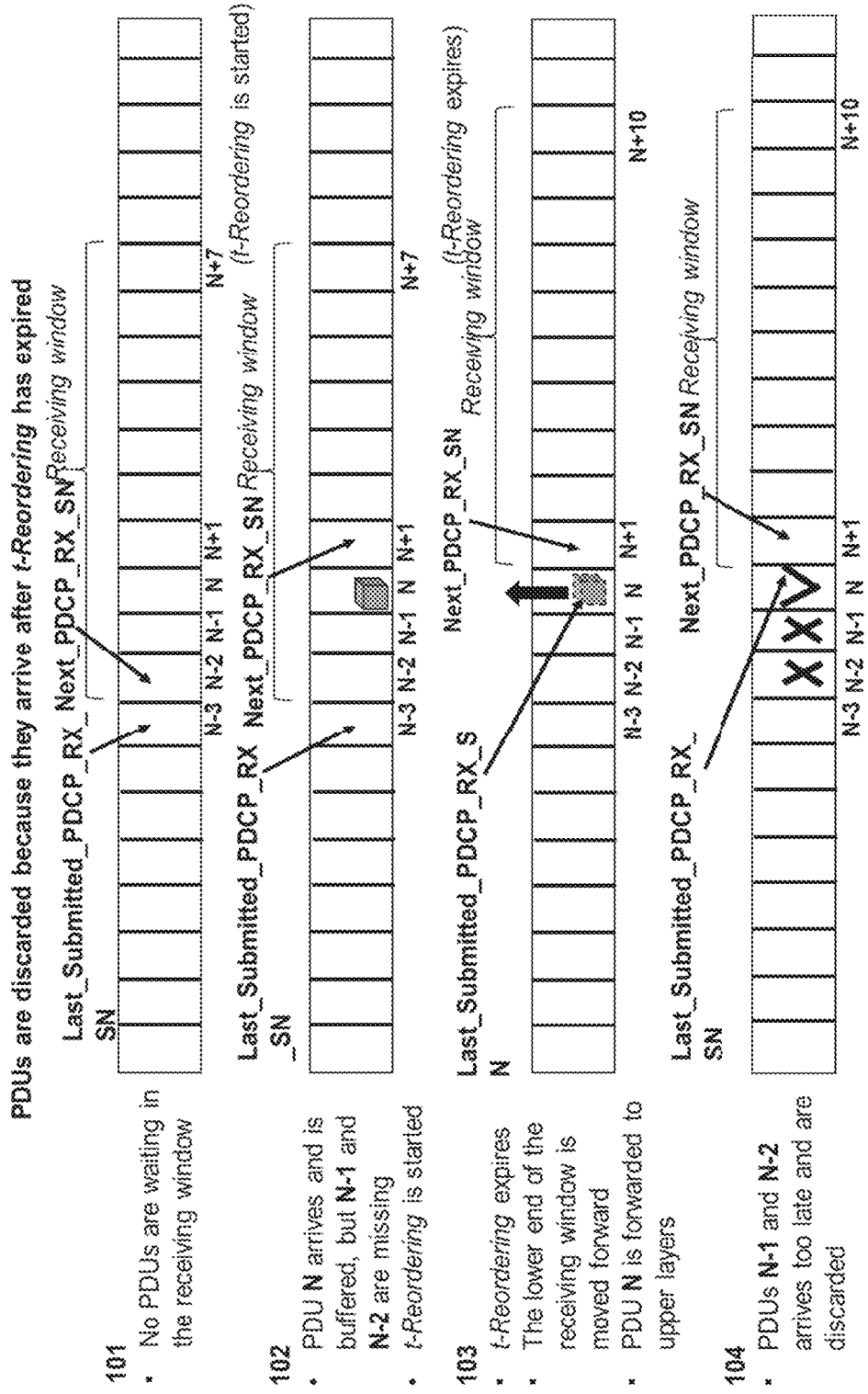
FIG. 1 schematically illustrates an example of PDCP reordering and in-order delivery according to prior art.

FIG. 1 schematically illustrates re-ordering and in-order delivery of the LTE PDCP. In action 101, no PDUs are awaiting in the receiving window, which receiving window in FIG. 1 encompasses Sequence Numbers (SN) N−2, N−1, N, N+1, . . . N+7. In action 102, a PDU N arrives and is buffered, but PDU N-1 and PDU N-2 are missing. Further, in action 102, the t-reordering timer is started. In action 103, when the t-reordering timer expires, e.g. when a time period corresponding to the receiving window has lapsed, the lower end of the receiving window is moved forward (in this example the receiving window then encompasses SNs N+1, N+2, . . . , N+10), and the PDU N is forwarded to one or more upper layers as indicated by the thick arrow in FIG. 1. In action 104, the PDUs N-1 and N-2 arrive too late, i.e. outside the receiving window, and are therefore discarded.

From a view-point of the PDCP it might not be obvious that the discards at action 104 is a drawback, but higher layers, such as a TCP layer, has also a reordering functionality and what is modelled as too late at the PDCP layer may not at all be too late for the reordering functionality at that higher layer, e.g. the TCP layer. Instead, a better-late-than-never delivery of packets with SNs N-1 and N-2 at action 104 will help to decrease triggering of higher layer's retransmission, such as a Retransmission Timeout (RTO) of the TCP layer, and thereby save bandwidth.

The better-late-than-never delivery may be accomplished by using a larger value for the t-Reordering timer, but that would obviously imply that PDCP PDUs already received out-of-sequence must reside longer in PDCP buffer before they may be forwarded to higher layers.

The amount of memory needed at the PDCP receiver, e.g. at a network node, such as at an eNB for an uplink transmission or at a UE for a downlink transmission, is greatly dependent on the length of the t-Reordering timer. With a long timer value there will be a need to potentially store many PDCP PDUs in case of one or more missing packets. For the communications network which may need to handle thousands of such data flow in parallel this extra memory requirement will be quite substantial.

A large value for the t-Reordering timer will also increase the risk:
that the upper layers on the sending side, e.g. at the UE for uplink transmission or at the eNB for downlink transmission, triggers RTO and starts to retransmit packets that is already waiting in buffer at the PDCP receiver e.g. at an eNB for an uplink transmission or a UE for a downlink transmission.
of head of line blocking such that one late packet for one TCP flow will delay packets for other TCP flows which have no missing packets. This may be quite harmful for the performance for e.g. interactive flows such as Quick User Datagram Protocol (UDP) Internet Connection (QUIC) and real-time video.
It may take longer time for the TCP transmitter, e.g. at the UE for an uplink transmission or at the eNB or gNB for a downlink transmission, to react to a sudden decrease in the available throughput over the air interface, e.g. the radio interface, because the t-Reordering timer may delay the detection of any discarded packets due to congestion. The TCP transmitter is an upper layer entity that handles the transmission of TCP packets.

An object addressed by embodiments herein is how to improve performance in a wireless communications network.

Embodiments described herein are related to the PDCP in a 5G new generation radio communications network. Some embodiments propose one or more ways to make implementation of a PDCP reordering function more efficient for an expected traffic pattern.

In some embodiments disclosed herein the legacy PDCP reordering function is improved so that PDCP PDU's arriving late and outside the receiving window because the t-Reordering timer has expired, are not discarded, provided they are received within a certain time limit. An extra timer is proposed to be added to determine how long to wait for when these late PDCP PDU's are discarded. Thus according to some embodiments described herein, reference may be referred to a first timer and to a second timer. The first timer may be the t-Reordering timer and the second timer may be a t-WaitForLatePDUs timer. Further, a reference to the first timer may be interpreted as a reference to a first period of time and a reference to the second timer may be interpreted as reference to a second period of time, and the terms timer, period of time, time period may sometimes herein be used interchangeably. However, it should be understood that the second period of time may be defined by the first period of time and an offset value. Therefore, some embodiments disclosed herein only comprise a single timer.

Sometimes in this disclosure the terms data unit, PDU and packet are used interchangeably. Further, sometimes in this disclosure, the term "PDU" is used when describing a method for handling the reception of PDUs, and the term "SDU" is used when describing the forwarding of a data packet to higher layers. Furthermore, sometimes herein reference may be made to layers in plural, e.g. when describing transmission of a PDU from lower layers to upper layers, but it should be understood that embodiments described herein are equally applicable to single layers, e.g. a PDU may be transmitted from a lower layer to an upper layer, or to a combination of single and plural layers. In for example, dual connectivity where there is two legs connected to the same PDCP entity reference may be made to lower layers in plural. Furthermore, it should be understood that a reference to an upper layer is the same as a reference to a higher layer, and vice versa.

It should be understood that embodiments described herein are equally applicable to a Radio Network Node (RNN), such as a gNB or an eNB, and to a communications device, such as a UE. Thus, for transmissions in the downlink, i.e. when the RNN is transmitting to the communications device, a reference to a PDCP receiver should be understood as a reference to the communications device, while for transmissions in the uplink a reference to the PDCP receiver should be understood as a reference the RNN.

The RNN and the communications device may also be referred to as a first and a second network node, respectively.

Figure 2:
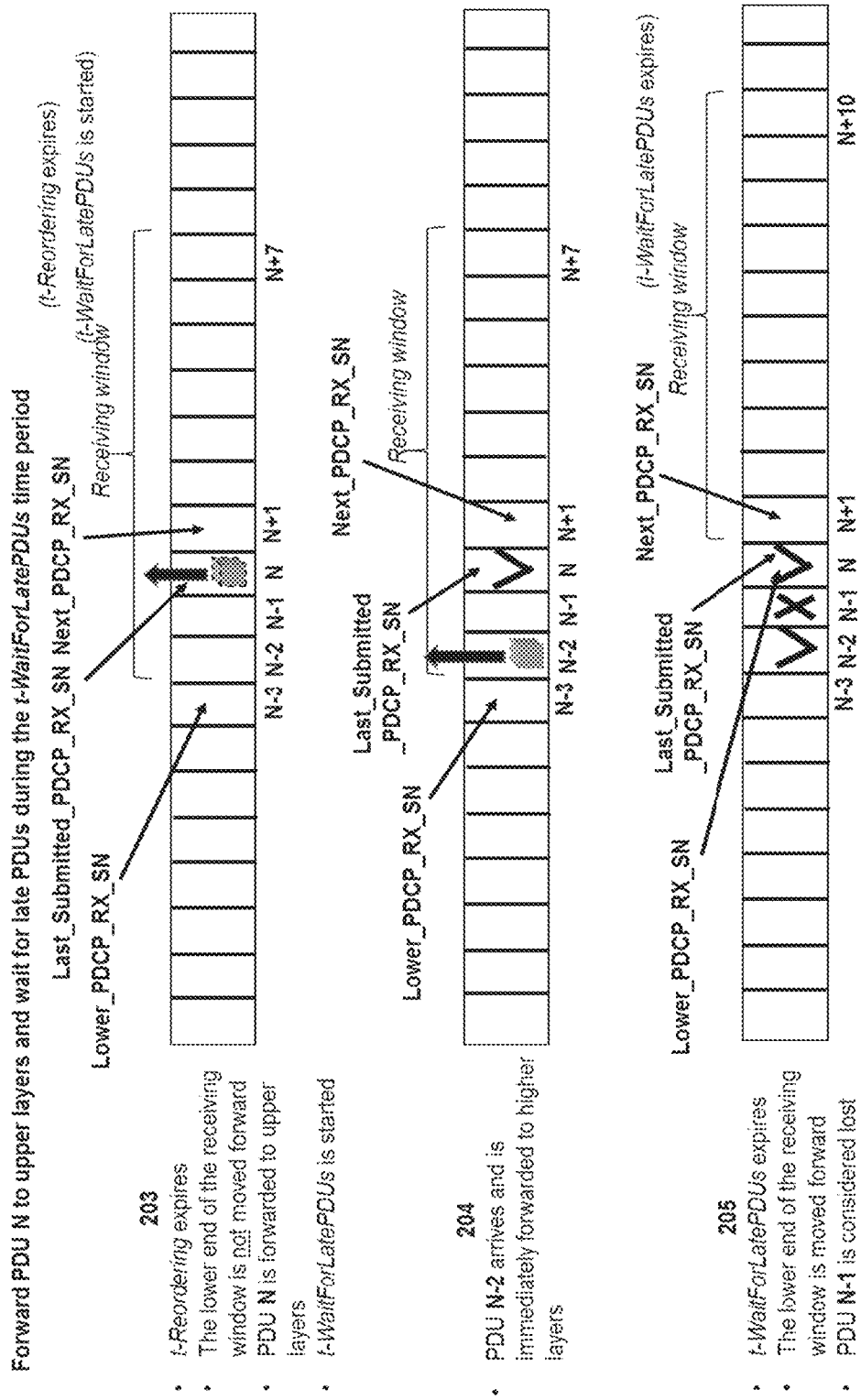
FIG. 2 schematically illustrates embodiments of PDCP reordering and in-order delivery.

FIG. 2 schematically illustrates embodiments relating to the forwarding of the PDU N to one or more upper layers and the awaiting for late PDUs during a t-Wait-ForLatePDUs time period.

In FIG. 2 three actions, actions 203-205, are shown. These actions may be preceded by two actions 201 and 202 corresponding to actions 101 and 102 of FIG. 1. Thus, in action 201, no PDUs are awaiting in the receiving window, and in action 202 a PDU N arrives out of order and is buffered, but PDU N-1, and PDU N-2 are missing.

In action 203, the t-reordering timer expires, the lower end of the receiving window is not moved forward as described in relation to FIG. 1. Instead the receiving window is retained at its current position. Further, the PDU N is forwarded to one or more upper layers and the t-WaitForLatePDUs timer is started.

In action 204, the PDU N-2 arrives and is forwarded, e.g. immediately forwarded, to one or more upper layers. Since the PDU N-2 is arrived out of the receiving window it is forwarded to the upper layer out of order, i.e. it will be forwarded out of sequence number order.

In action 205, the t-waitForLatePDUs timer expires, the lower end of the receiving window is moved forward, and the PDU N-1 is considered as lost.

As FIG. 2 shows, the timer t-WaitForLatePDUs is started when t-Reordering timer expires, and it is the t-WaitForLatePDUs timer that is responsible for moving the lower edge of the receiving window once the t-WaitForLatePDUs timer expires. During the time when the t-WaitForLatePDUs timer is running, any late PDUs that are received by the PDCP receiver, will immediately be forwarded to higher layers. Thus, they will be forwarded in any order to the higher layers, i.e. they may be forwarded out of sequence number order to the higher layers.

By differentiating between the time when reordering is enforced and the time when late packets are anyway forwarded, it is possible in many cases to decrease the length of the t-Reordering timer which will have the advantage that spurious retransmissions of the TCP transmitter due to longer latencies is reduced, head of line blocking is minimized, and memory usage is reduced. The TCP transmitter is an upper layer entity that handles the transmission of TCP packets. FIGS. 3A-3C show three examples that schematically shows how the length of the reordering window depends on the t-Reordering timer and how the reordering window may be decreased when using a separate t-WaitForLatePDUs timer. FIG. 3A illustrates a large reordering window using 18 bits sequence numbers which gives 131072 entries if half of the window space is used for buffering PDUs. Thus, the memory needed for the reordering window may be quite large because usually a reference to the stored PCDP PDU needs to be stored in each window entry, so that packets quickly can be forwarded to higher layers in order, i.e. in sequence number order, and also the packets themselves need to be stored. As illustrated in FIG. 3B, the reordering window may be shorter when a t-reordering timer is used, but the length of the reordering window will depend on the length of the t-reordering timer, and thus the reordering window may be large when the t-reordering timer corresponds to a long time period. In FIG. 3C it is illustrated how the reordering window, which as mentioned above depends on the t-reordering timer, may be even shorter if late received packets received outside the reordering window are allowed to be forwarded to higher layers.

Normally the t-WaitForLatePDUs timer does not require any memory, since it is only guarding the lower end of the receiving window and is hence used for knowing where the reception window starts. However, it may also be useful to use a duplicate detection functionality in the PDCP for these late packets that may arrive. A duplicate detection function may be implemented by using a window, e.g. a receiving window, associated with the t-WaitForLatePDUs timer, but where this window only needs one bit per window entry to indicate if a certain PDCP PDU has been received or not. Thus, in order to provide duplicate detection in the PDCP receiver while the receiver is waiting for any late PDUs after the t-Reordering timer has expired, a window associated with the t-WaitForLatePDUs may be used to detect and discard duplicates. FIG. 4 schematically shows how this window may be used. The memory needed for this window, e.g. the receiving window, associated with the t-WaitForLatePDUs timer is rather small because only one bit is needed per entry to indicate if a PDU has been received or not.

Even though a window is needed for the duplicate detection mechanism the actual memory required for this window is reduced as compared to the window used for t-Reordering functionality, as schematically illustrated in FIG. 5. For example, assume a 5 Gbps throughput and an MTU size of 1500 bytes. If the t-Reordering timer needs to be set to 80 ms because a t-WaitForLatePDUs timer is not used, up to 33360 packets are needed to be stored in the window corresponding to a 50 Mbyte memory space. This corresponds to the prior art scenario. If instead both a t-Reordering timer set to 20 ms and a t-WaitForLatePDUs timer set to 120 ms to wait for late PDUs are used, only 8340 packets are needed to be stored in the window corresponding to a 12.5 Mbyte memory space. Further, the window to keep track of received PDCP PDUs while the t-WaitForLatePDUs timer is running has a size of 50040 bits corresponding to a 6 Kbytes memory space. Thus, the memory space required for some embodiments disclosed herein are lesser than the memory space required by the prior art solution.

Therefore, some embodiments disclosed herein provides a second timer that controls whether data units arriving later to a given entity than the expiration of a first timer is to be discarded or delivered on to further entities. The first timer is started when an out-of-order data unit is detected. By the expression "an out-of-order data unit" when used in this disclosure is meant that the data unit is received out of sequence number order. In other words, an out-of-sequence data unit is a data unit received with a higher sequence number than the most recent data unit received and there is a gap in the sequence numbers between these two data units. The fact that one or more out-of-order data units are received, implies that there are one or more missing data units, some of which may be received at a later point of time while the first timer is still running, some even later while only the second timer is running and further some after the second timer expires. When the first timer expires all data units that has been received in sequence, i.e. up to the first missing data unit, are delivered and forwarded to upper layers. When the second timer expires, data units of two types are delivered and forwarded to upper layers. The first type of data units are those that were received out-of-order while the first timer was running. The second type of data units are those that were missing when the first timer expired but which were received before expiry of the second timer. These two types of data units are typically delivered in the order they appear in sequence, although they may also be delivered in any order, i.e. in any sequence number order. Thus, the order is not important when the second timer expires. Further, when the second timer expires, the receiver does not wait any longer. If any of the one or more data units that were missing when the first timer expired are still missing when the second timer expires, their place and fragmented presence in data structures are cleared and subsequently received data units or fragments of same are immediately discarded. It should be understood that the PDUs are identified by sequence numbers. Therefore, a reference to a missing data unit may be interpreted as a reference to a data unit identified by a sequence number which is expected but has not been received, and a data unit which is received out-of-sequence may be interpreted as a reference to a data unit identified by a sequence number which comes after the sequence number of some missing data unit. A reference to a data unit arriving too late may be interpreted as a data unit arriving after the expiry of the second timer and identified by its sequence number as a data unit that was noted to be a missing data unit while the first timer was running, and was still missing when the second timer expired.

The expiration timer values of the first and second timers may be set based on estimates of the round trip times between a sender and a receiver of a first level transport protocol of the data generator entity, and the one-way latency between a second level sender and receiver transport protocol. For example, the expiration timer values may be estimated based on the round trip times between two network nodes, e.g. between a Radio Network Node and a communications device.

According to some embodiments, the first level is an IP-layer transport protocol functionality such as a TCP, a UDP or a QUIC protocol, and the second level is an access network transport functionality, such as the 3GPP PDCP, or the RLC protocol. The first level corresponds to a higher layer and the second level corresponds to a lower layer.

Some embodiments herein disclose window based methods to keep track of received PDUs related to the first and second timers.

Some embodiments herein disclose duplicated detection function of the implemented window based methods wherein windows only needs one bit per window entry to indicate if a certain data unit has been received or not.

Note that although terminology from LTE is used in this disclosure to exemplify the embodiments herein, this should not be seen as limiting the scope of the embodiments herein to only the aforementioned system. Other wireless systems, such as for example a NR network, 5G network, an LTE network, a Wideband Code Division Multiple Access (WCDMA) network, a Global System for Mobile Communications (GSM) network, any 3GPP cellular network, a Worldwide Interoperability for Microwave Access (WiMAX) network, a Wireless Local Area Network (WLAN), a Low Rate Wireless Personal Access Network (LR-WPAN) as defined in e.g. IEEE 802.15.4, a Bluetooth network, a SIGFOX network, a Zigbee network, a Bluetooth Low Energy (BLE) network such as a Bluetooth Smart network, or a Cellular Internet of Things (CIoT) network such as an Enhanced Coverage GSM-IoT (EC-GSM-IoT) network, a Narrow Band IoT (NB-IoT) network or a network comprising one or more wireless devices configured for Machine Type Communication (MTC) sometimes herein referred to as an eMTC network, may also benefit from exploiting the ideas covered within this disclosure.

Further, the description frequently refers to wireless transmissions in the uplink, but embodiments herein are equally applicable in the downlink.

In the following section, embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Some exemplifying embodiments will now be described in more detail.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

It should furthermore be noted that, to anyone skilled in the art, there are several realizations of the embodiments below with principally equivalent functionality.

In addition, it should be noted that message names, parameters, information elements and field names may change during the course of the specification work which implies that embodiments described herein still apply as long as the principal function and/or use is the same.

Figure 6:
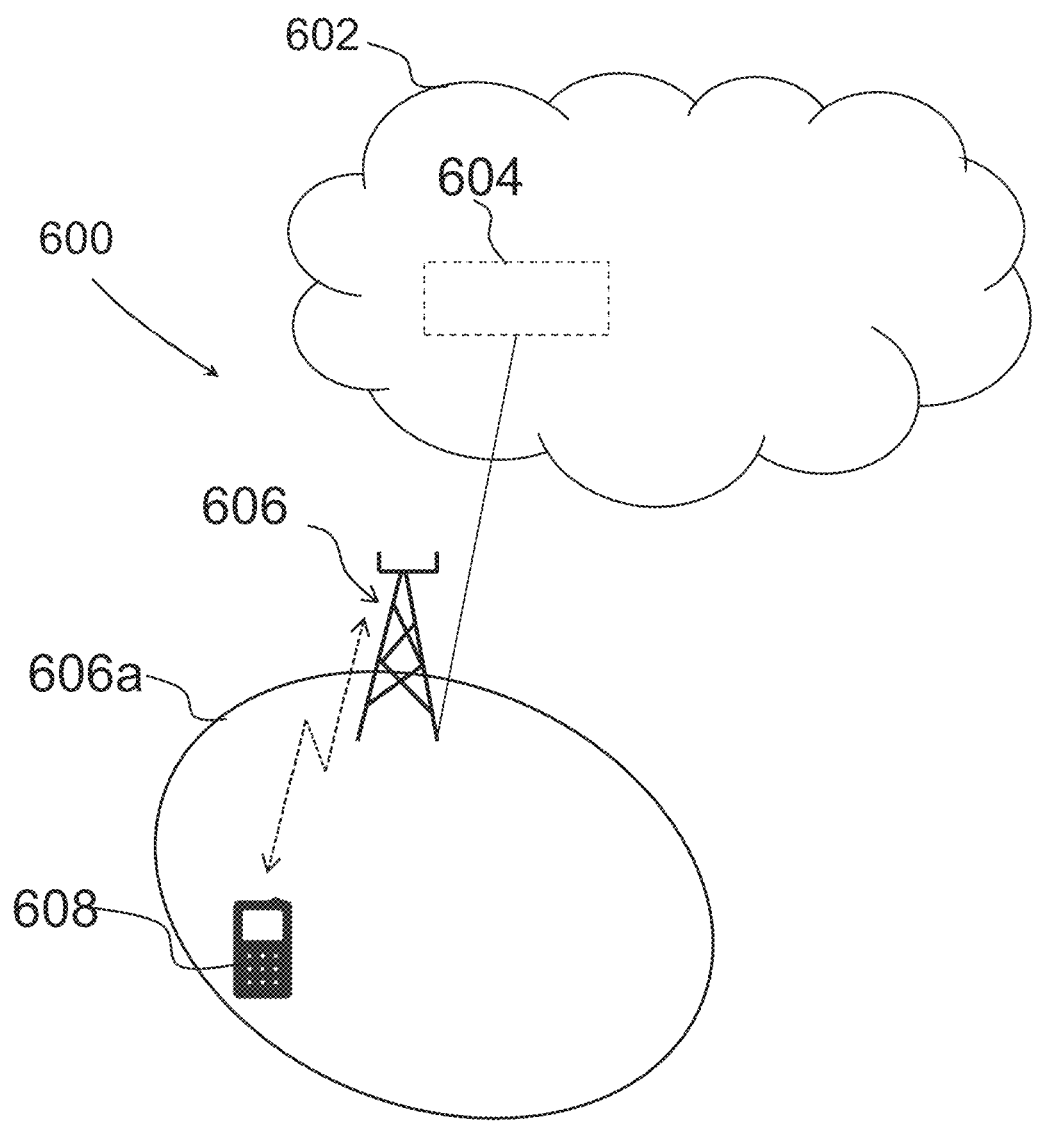
FIG. 6 schematically illustrates embodiments of a wireless communications network.

FIG. 6 depicts an example of the wireless communications network 600 in which embodiments herein may be implemented. The wireless communications network 600 may be a cellular communications network such as a NR network, a 5G network, an LTE network, a WCDMA network, a GSM network, any 3GPP cellular network, or a short range communications network, such as a WLAN, an LR-WPAN, a Bluetooth network, WiMAX network, a SIGFOX network, a Zigbee network, a BLE network such as a Bluetooth Smart network, or a CIoT network such as an EC-GSM-IoT network, a NB-IoT network or an eMTC network, or a combination of one or more of the aforementioned communications networks just to mention some examples.

A Core Network (CN) 602 may be comprised in the communications network 600 The core network 602 may be an NR core network, a 5G core network, an LTE core network, a WCDMA core network, a GSM core network, any 3GPP cellular core network, or a short range communications core network, such as a WLAN core network, an LR-WPAN core network, a Bluetooth core network, WiMAX core network, a SIGFOX core network, a Zigbee core network, a BLE core network such as a Bluetooth Smart network, or a CIoT network such as an EC-GSM-IoT core network, a NB-IoT core network or an eMTC core network, or a combination of one or more of the aforementioned communications core networks just to mention some examples.

A Core Network Node (CNN), 604 may be comprised in or arranged in communication with the core network 602. The core network node 604 may be a Mobility Management Entity (MME) or a Serving GPRS Support Node (SGSN). The core network node is sometimes referred to as just a network node 604.

A Radio Network Node (RNN), 606 is arranged and configured to operate in the communication network 600. The RNN 606 is configured for wireless communication with communications devices, e.g. communications devices such as a communications device 608, when they are located within a coverage area 606a, e.g. a geographical area served by the RNN 606. It should be understood that the RNN 606 may serve or manage a plurality of coverage areas 606a, even though only one is illustrated in FIG. 6 for clarity reasons. The one more coverage areas 606a are sometimes in this disclosure referred to as one or more cells 606a.

The RNN 606 may be a transmission point such as a radio base station, for example a gNB, an E-UTRA node, a LTE eNB, an eNB, an Node B, or an Home Node B, an Home eNode B, a Base Station Transceiver (BTS) or any other network node being capable to serve a communications device in a communications network, such as the communications network 600. The RNN 606 may further be configured to communicate with the core network node 604. The RNN 606 is sometimes referred to as just a network node 606.

A communications device 608 is operating in the wireless communications network 600. The communications device 608, also sometimes referred to as a wireless communications device, a wireless device, a user equipment (UE), or a Mobile Station (MS), may be located in the wireless communications network 600. For example, the communications device 608 may be an Internet of Things (IoT) device, a user equipment, a mobile terminal or a wireless terminal, a mobile phone, a computer such as e.g. a laptop, a Personal Digital Assistants (PDAs) or a tablet computer, with wireless capability, or any other radio network units capable to communicate over a radio link in a wireless communications network. It should be noted that the term user equipment used in this document also covers other wireless devices such as Machine to Machine (M2M) devices, even though they are not handled by any user. In some embodiments, the communications device 608 is a stationary wireless device. Thus, the communications device 608 is sometimes in this disclosure referred to as a stationary communications device 608. By the expression "stationary wireless device" when used herein is meant that the communications device 608 is not moving. For example, the stationary communications device 608 is not moving when in use, e.g. during operation.

The communications device 608 is sometimes referred to as just a network node 608. Further, the RNN 606, the communications device 608, and the core network node 604, may be referred to as first, second and third network nodes 608, 606, 604.

Figure 8:
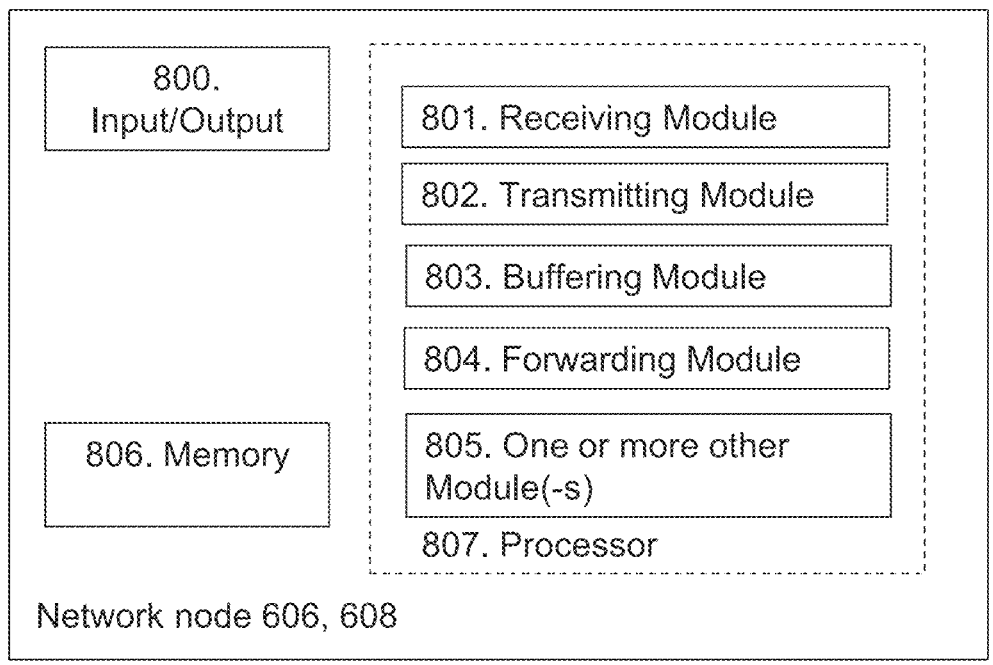
FIG. 8 is a schematic block diagram illustrating embodiments of a network node.

More specifically the followings are network node 606, 608 related embodiments:

The network node embodiments relate to FIGS. 7A, 7B and 8.

A method performed by a network node 606, 608, such as the RNN 606 or the communications device 608, for PDCP reordering will now be described. As previously mentioned, the network node 606,608 is operating in the wireless communications network 600. The method comprises one or more of the actions below and it should be understood that actions may be combined and that actions may be performed in any suitable order.

Action 701A,701B

The network node 606,608 buffers one or more first data units received out of order from a lower layer and during a first time period. Especially, the network node 606,608 buffers in order one or more first data units received out of order by a PDCP layer. In other words, the network node 606,608 buffers in sequence number order the one or more first data units received out of sequence number order by the PDCP layer. As mentioned above, the one or more first data units are received from a lower layer during a first time period. Further, the lower layer is a layer below the PDCP layer.

This action relates to Action 202 previously described and may be performed by a buffering module, e.g. a buffering module 803, comprised in the network node 608, 606, such as the RNN 606 or the communications device 608. The buffering module 803 may be implemented by or arranged in communication with a processor 807 of the network node 608, 606. The processor 407 and the buffering module 803 will be described in more detail below.

Action 702A,702B When the first time period has expired, the network node 606,608 forwards the one or more buffered first data units in order to an upper layer. In other words, the network node 606,608 forwards the one or more buffered first data units in sequence number order to the upper layer. Further, the network node 606,608 starts a second time period. The upper layer is a layer, e.g. a TCP layer, above the PDCP layer.

The expiry of the first and second time periods may be determined by a respective first and second timer, or may be determined by the first timer and a PDCP sequence number offset. The PDCP sequence number offset is an offset from the Last_Submitted_PDCP_RX_SN parameter. The Last_Submitted_PDCP_RX_SN parameter tracks the sequence number corresponding to the last one of the first data units that are in sequence. The Last_Submitted_PDCP_RX_SN may also be defined to indicate the sequence number SN of the last PDCP SDU delivered to the upper layers.

For example the first and second time periods may be calculated based on a multiplicity of the round trip time.

In some embodiments, the first and second time periods are set based on an estimate of round trip times between network nodes 606,608, e.g. between the network node 606,608 and another network node 606,608, or based on a PDCP data unit one-way delay and its variance.

In some embodiments, the network node 606,608 associates a window with the second time period, and for each entry of the window the network node 606,608 indicates whether or not a certain data unit has been received. Further, the network node 606,608 may discard a received data unit when the received data unit is indicated as already being received. Thus, an already received data unit will not be forwarded.

This action relates to Action 203 previously described and may be performed by a forwarding module, e.g. a forwarding module 804, comprised in the network node 608, 606, such as the RNN 606 or the communications device 608. The forwarding module 804 may be implemented by or arranged in communication with the processor 807 of the network node. The forwarding module 804 will be described in more detail below.

Action 703A,703B

The network node 606,608 forwards, to the upper layer, one or more second data units received from the lower layer during a second time period. The network node 606,608 may forward, to the upper layer and in any order, the one or more second data units received from the lower layer during the second time period. Thereby, the one or more second data units arriving too late to the PDCP layer to be buffered in order is forwarded to the upper layer in time for a reordering functionality of the upper layer.

In some embodiments, the one or more second data units are immediately forwarded to the upper layer, e.g. they are forwarded directly after reception. In other words, the network node 606,608 may forward the one or more second data units to the upper layer directly after reception of the one or more second data units. The first and second time periods may be consecutive time periods.

This action relates to Action 204 previously described and may be performed by the forwarding module, e.g. the forwarding module 804.

Action 704B

In some embodiments, the network node 606,608 moves a lower end of a receiving window forward to a sequence number N+1 upon expiration of the second time period. In such embodiments, the second time period was started at a sequence number N, and the receiving window comprises the first time period and the second time period. This action relates to Action 205 previously described.

To perform the method for PDCP reordering, the network node 606,608 may be configured according to an arrangement depicted in FIG. 8. As previously described, the network node 206,208 is configured to operate in the wireless communications network 200.

The network node 608, 606, such as the RNN 606 or the communications device 608, may comprise an interface unit, e.g. an input/output interface 800, to facilitate communications between the network node and other network nodes or devices. The interface may, for example, include a transceiver configured to transmit and receive radio signals over an air interface in accordance with a suitable standard.

The network node 608, 606, such as the RNN 606 or the communications device 608, is configured to receive, by means of a receiving module 701 configured to receive, a transmission, e.g. a data unit, a data packet, a signal or information, from one or more network nodes. The receiving module 801 may be implemented by or arranged in communication with the processor 807 of the network node.

The network node 608, 606, such as the RNN 606 or the communications device 608, is configured to transmit, by means of a transmitting module 701 configured to transmit, a transmission, e.g. a data unit, a data packet, a signal or information, from one or more network nodes. The transmitting module 801 may be implemented by or arranged in communication with the processor 807 of the network node.

As mentioned above, the network node 606, 608, such as the RNN 606 or the communications device 608, is configured to buffer, by means of e.g. a buffering module 803 configured to buffer, one or more first data units. The buffering module 803 may be implemented by or arranged in communication with the processor 807.

The network node 606, 608 is configured to buffer in order one or more first data units received out of order by a PDCP layer. The one or more first data units are configured to be received from a lower layer during a first time period, and the lower layer is a layer below the PDCP layer.

As mentioned above, the network node 606, 608, such as the RNN 606 or the communications device 608, is configured to forward, by means of e.g. the forwarding module 804 configured to forward, data units to an upper layer. The forwarding module 804 may be implemented by or arranged in communication with the processor 807 of the network node.

The network node 606, 608 is configured to forward the one or more buffered first data units in order to an upper layer when the first time period has expired. Further, the network node 606, 608 is configured to start a second time period. The upper layer is a layer above the PDCP layer.

Further, the network node 606, 608 is configured to forward, to the upper layer and in any order, one or more second data units configured to be received from the lower layer during the second time period. Thereby the one or more second data units arriving too late to the PDCP layer to be buffered in order is forwarded to the upper layer in time for a reordering functionality of the upper layer.

In some embodiments, the network node 606, 608 is configured to forward the one or more second data units to the upper layer directly after reception of the one or more second data units.

As previously mentioned, the first and second time periods may be configured to be consecutive time periods.

In some embodiments, the network node 606, 608 is configured to move a lower end of a receiving window forward to a sequence number N+1 upon expiration of the second time period. The second time period is configured to be started at a sequence number N, and the receiving window is configured to comprise the first time period and the second time period.

The network node 606, 608 may be configured to set the first and second time periods based on an estimate of the round trip times between network nodes 606, 608 or based on a PDCP data unit one-way delay and its variance.

In some embodiments, the network node 606, 608 determines expiry of the first and second time periods by a respective first and second timer, or by the first timer and a PDCP sequence number offset.

The network node 606, 608 may be configured to associate a window with the second time period, and for each entry of the window indicate whether or not a certain data unit has been received. Further, the network node 606, 608 may be configured to discard a received data unit when the received data unit is indicated as already being received.

In some embodiments, the network node 608, 606, such as the RNN 606 or the communications device 608, is configured to perform, by means of one or more other modules 805 configured to perform one or more further actions described herein. The one or more other modules may be implemented by or arranged in communication with the processor 807 of the network node.

The network node 608, 606, such as the RNN 606 or the communications device 608, may also comprise means for storing data. In some embodiments, the network node 608, 606 comprises a memory 806 configured to store the data. The data may be processed or non-processed data and/or information relating thereto. The memory 806 may comprise one or more memory units. Further, the memory 806 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the network node.

Embodiments herein for PDCP reordering may be implemented through one or more processors, such as the processor 807 in the arrangement depicted in FIG. 8, together with computer program code for performing the functions and/or method actions of embodiments herein. The program code mentioned above may also be provided as a computer program product, for instance in the form of a data carrier carrying computer program code for performing the embodiments herein when being loaded into network node. One such carrier may be in the form of an electronic signal, an optical signal, a radio signal or a computer readable storage medium. The computer readable storage medium may be a CD ROM disc or a memory stick. The computer program code may furthermore be provided as program code stored on a server and downloaded to the network node.

Those skilled in the art will also appreciate that the input/output interface 800, the receiving module 801, the transmitting module 802, the buffering module 803, the forwarding module 804, and the one or more other modules 805 above may refer to a combination of analogue and digital circuits, and/or one or more processors configured with software and/or firmware, e.g. stored in the memory 806, that when executed by the one or more processors such as the processors in the network node perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Some Exemplifying Embodiments

In this sections, some exemplifying embodiments will be described in more detail.

Some First Exemplifying Embodiments Using a Timer

Figure 9:
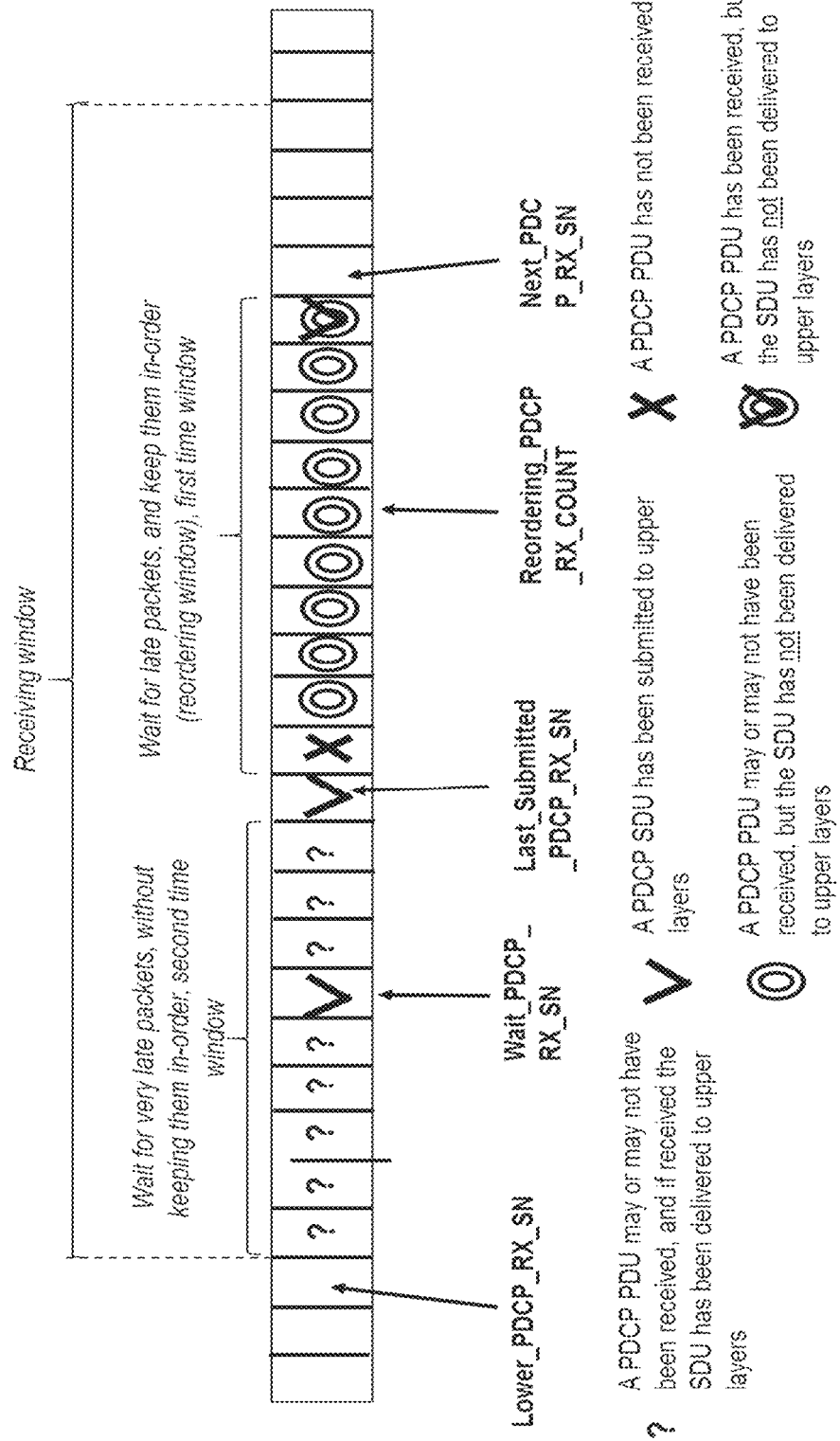
FIG. 9 schematically illustrates parameters that may be used in embodiments of a network node.

FIG. 9 schematically illustrates some parameters that may be used in the PDCP receiver, e.g. the network node 606, 608, such as the RNN 606 for an uplink transmission or the communications device 608 for a downlink transmission, to handle re-ordering and in-order delivery of PDCP SDUs and further, specifically as proposed by some embodiments, to provide delivery of late PDCP SDUs to higher layers even if they are received and delivered out-of-order.

As schematically illustrated in FIG. 9, the receiving window comprises a first time window and a second time window. During the first time window the network node 606, 608 waits for late packets and keep them in order, e.g. in sequence number order. The first time window is sometimes referred to as the reordering window. During the second time window the network node 606, 608 waits for late, e.g. very late, packets without keeping them in order. The late packets are received outside the first time window.

In the illustrated example five parameters are shown. A first parameter is a Lower_PDCP_RX_SN parameter indicating the sequence number of the lower edge of the receiving window. A second parameter is a Wait_PDCP_RX-SN parameter indicating the sequence number of the last submitted PDCP PDU that was delivered to the upper layer when the t-WaitForLatePDUs timer expired. A third parameter is a Last_Submitted_PDCP_RX_SN parameter indicating the sequence number of the last PDCP SDU that was submitted in-order to the upper layer. It should be understood that the data unit indicated by Last_Submitted_PDCP_RX_SN has already been delivered to higher layers, and is therefore not subject to reordering. The sequence numbers above this value are part of the reordering window because (Last_Submitted_PDCP_RX_SN+1) has not been delivered yet to higher layers. A fourth parameter is a Reordering_PDCP_RX_COUNT parameter indicating the COUNT value of the PDCP PDU following the COUNT value of the PDCP PDU that triggered t-Reordering. The Reordering_PDCP_RX_COUNT parameter indicates the sequence number that the lower edge of the reordering window should be moved to when the t-Reordering timer expires. A fifth parameter Next_PDCP_RX_SN indicates the sequence number of the PDCP PDU that is expected to be received by the PDCP entity.

As in LTE, when the t-Reordering timer expires, all buffered and assembled SDUs are delivered to the upper layers. The variable Last_Submitted_PDCP_RX_SN is updated to track the SN corresponding to the last of those SDUs that are in sequence. This mechanism is proposed in some embodiments to be reused for PDCP.

As in LTE, the t-Reordering timer is proposed to be used for advancing the lower edge of the reordering window, but in some embodiments disclosed herein it is proposed to use an additional timer, called a t-WaitForLatePDUs timer, to advance the lower edge of the complete receiving window, where the reordering window is a subset of the receiving window. In this way, there will be a first faster process, that uses a smaller reordering (in-order-delivery) window handled by the t-Reordering timer, which ensures in-sequence deliveries to the upper layers and enough time for the lower layers to perform retransmission. Further, there will be a second slower process, handled by the t-WaitForLatePDUs timer, which advances the lower edge of the receiving window and allows immediate deliveries of received PDCP PDUs with no re-ordering for PDCP PDUs received outside the reordering window but inside the receiving window.

While the t-WaitForLatePDUs timer is running, the PDCP receiver, e.g. the network node 606, 608, such as the RNN 606 for an uplink transmission or the communications device 608 for a downlink transmission, will continue to forward any SDU, e.g. any PDCP SDU, that was noted to be missing after the first process of in-sequence delivery, as soon as they may get fully received and assembled, i.e. without concern of its sequence number and the order in which it gets to be forwarded.

If there is no missing PDUs when the t-Reordering timer expires, the timer t-WaitForLatePDUs does not need to be used. If that is the case, the Last_Submitted_PDCP_RX_SN is a good marker of a lower edge of both the reordering window and the in-order-delivery window, i.e. the Lower_PDCP_RX_SN may be set to the Last_Submitted_PDCP_RX_SN.

If instead there are missing SDUs, the t-WaitForLatePDUs timer may be started if not already started to supervise a late out-of-sequence delivery during which Lower_PDCP_RX_SN, i.e. the lower end of the reordering window, does not change.

Some Second Exemplifying Embodiments for Improved Window Handling at the PDCP Layer In some embodiments, the receiving window of the PDCP receiver, e.g. the network node 606, 608, such as the RNN 606 for an uplink transmission or the communications device 608 for a downlink transmission, is controlled by the t-WaitForLatePDUs timer, while the t-Reordering timer is instead controlling an upper subset of this window, which is the reordering window. The reordering window may be visualized as a pushed window, i.e. a window which is pushed from its lower end. The event or action that performs the pushing is the in-sequence submission to higher layers, which, similar to LTE, is controlled by the variable Last_Submitted_PDCP_RX_SN that keeps track of that lower edge of the reordering window. For some embodiments, the lower edge of the reordering window is controlled by the variable Lower_PDCP_RX_SN, and is used to wait for late PDCP SDUs. The receiving window thus comprises two parts: a sub window in the form of the reordering window, which ensures in-order-delivery, and a trailing part which is used to wait for any late PDUs but does not ensure in-order-delivery.

In some sub embodiments, the Last_Submitted_PDCP_RX_SN variable is updated using the t-Reordering timer just like in LTE, and controls the lower edge of the in-order-delivery window, which is an upper subset of the receiving window.

In some sub embodiments, the Lower_PDCP_RX_SN variable is updated using the t-WaitForLatePDUs timer, and this variable controls the lower edge of the receiving window.

In some sub embodiments, when the t-WaitForLatePDUs timer expires, the lower edge of the PDCP receiving window will be moved forward to the sequence number for which the t-WaitForLatePDUs timer was started.

In some sub embodiments, the Wait_PDCP_RX_SN variable stores the sequence number for which the Lower_PDCP_RX_SN will be set to when the t-WaitForLatePDUs timer expires.

In some sub embodiments, the receiving window uses the variable Wait_PDCP_RX_SN to keep track of the last SDU that was delivered to upper layers when t-WaitForLatePDUs was (re)started.

As a consequence of some embodiments, if the t-Reordering timer is set to 0 it means that the reordering window will have zero length, and thus no enforcement of in-order-delivery will be done, but any late PDCP SDUs received within the receiving window and which has not already been forwarded will be forwarded directly to upper layers, even if they are out-of-order.

As another consequence of some embodiments, if the t-WaitForLatePDUs timer is set to 0 it means that the in-order-delivery window, i.e. the reordering window, will be exactly the same as the receiving window because the t-WaitForLatePDUs timer will immediately expire once started. Thereby, the lower edge of the receiving window will be the same as the reordering window, and hence any late PDCP PDUs received within the receiving window will also be received within the in-order-delivery window, and thus in-order delivery will be maintained towards upper layers.

In some embodiments, the t-WaitForLatePDUs timer is started at expiry of the t-Reordering timer but only at occurrence of missing SDUs. In some other embodiments, the t-WaitForLatePDUs timer is started at the same time as the t-Reordering timer. In such a case, the t-WaitForLatePDUs timer is set to a larger value, approximately equal or preferably slightly less than a Round-trip Time (RTT) used by the higher layer, such as the TCP RTT. The reason for not forwarding packets that has been stuck longer than a RTT is that the TCP does not keep transmitted segments in memory for ever.

In some embodiments, the rest of the receiving window which is not in the reordering window is mapped to an array of indicators that keeps track of PDUs that have been received. This was described above with reference to e.g. FIG. 4. The array is used to detect duplicates, i.e. PDUs which have already been received. Thus, if the PDCP receiver, e.g. the network node 606, 608, such as the RNN 606 for an uplink transmission or the communications device 608 for a downlink transmission, receives a PDCP PDU which has an SN for which a PDCP PDU has already been received, the PDCP will discard the packet.

Some Third Exemplifying Embodiments for Estimating the Timer Values Used at the PDCP Receiver In all these embodiments, the values of the t-Reordering timer and the t-WaitForLatePDUs timer may be set based on an estimate of the higher layer protocol round trip time, e.g. the TCP RTT, referred here to as T_higherlayerRtt and an estimate of the PDCP PDU one-way delay and its variance referred here to as T_delay and T_delayVariance respectively, such as;

If T_delayVariance<T_higherlayerRtt then
  t-Reordering=alfa*T_higherlayerRtt
  t-WaitForLatePDUs=T_higherlayerRtt
Else If T_delayVariance>=T_higherlayerRtt then
  t-Reordering=T_delayVariance
  t-WaitForLatePDUs=0
End
wherein alfa is a scaling factor between 0 to 1.

Exemplifying starting values for an adaptive parameter settings mechanism for the two timers are;
  t-Reordering=3*HARQ RTT (e.g. 3*HARQ transmissions round trip time in a 3GPP system like LTE, ~16 ms)
  t-WaitForLatePDUs=2*RLC ARQ RTT (e.g. 2*RLC ARQ transmissions round trip time in a 3GPP system like LTE, ~72 ms)

The PDCP PDU one-way delay T_delay may be measured via a ping program method between the UE and the RNN, and the variance, T_delayVariance, may be calculated from those measurements. When PDPC and RLC are implemented in the same network node, e.g. in the eNB in LTE, the PDCP PDU one-way delay T_delay may be implicitly measured by checking the time when sending a RLC data unit and then checking the time of receiving the corresponding RLC acknowledgement and calculate the PDCP PDU one-way delay T_delay, and then its variance, T_delayVariance, from those measurements.

The T_higherlayerRtt may also be measured by pings between the RNN and the UE, and the RNN and the higher-layer protocol sender, e.g. an Internet server, and adding them together. The T_higherlayerRtt may also be implicitly measured by examining the higher-layer protocol headers for time stamp values and matching data units with its corresponding acknowledgements.

In some first to third exemplifying embodiments described above, a timer is used to determine when to move the lower edge of the receiving window. In some fourth exemplifying embodiments to be described below, an offset, e.g. a fixed offset, is used instead to define the lower edge of the receiving window.

Figure 10:
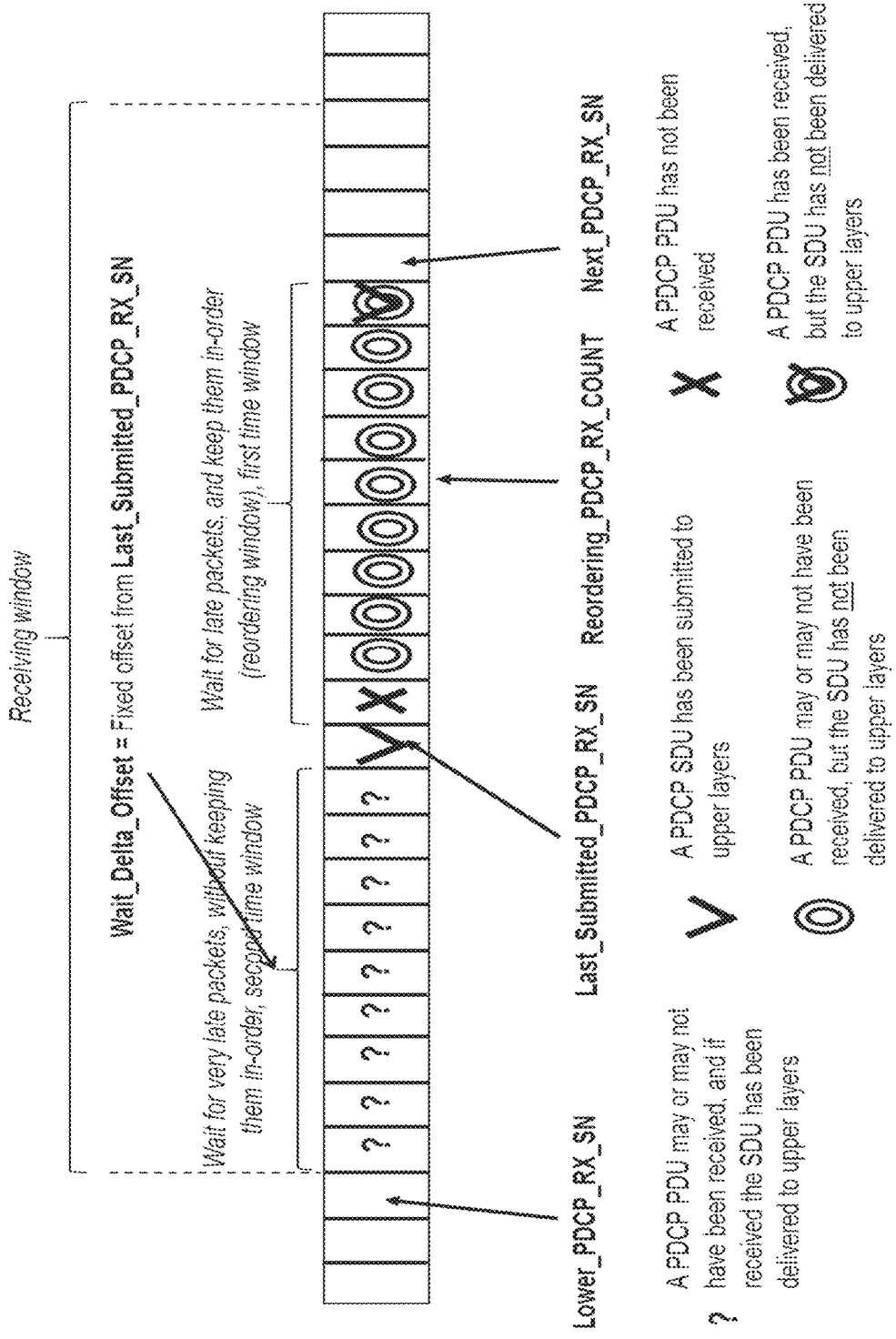
FIG. 10 schematically illustrates parameters that may be used in embodiments of a network node.

Some Fourth Exemplifying Embodiments Using a Fixed Offset Instead to Define the Lower Edge of the Reordering Window FIG. 10 schematically illustrates the use of a Wait_Delta_Offset parameter to defined the start of the receiving window from the Last_Submitted_PDCP_RX_SN parameter.

Some fourth exemplifying embodiments is similar to some embodiments wherein a timer is used to move the lower edge of the receiving window, but the difference is that the lower edge of the receiving window is instead set to an offset from the Last_Submitted_PDCP_RX_SN parameter.

When the word "comprise" or "comprising" is used in this disclosure it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method for handling data units in a communication protocol layer of a network node for a wireless communications network, the method comprising:
  receiving, from a lower protocol layer, one or more first data units with corresponding first sequence numbers;
  upon expiration of a first timer, forwarding the first data units to a higher protocol layer without receiving one or more second data units, from the lower protocol layer, with corresponding second sequence numbers that are lower than the first sequence numbers; and
  forwarding, to the higher protocol layer, any of the second data units that were received from the lower protocol layer during a second time period after expiration of the first timer,
  wherein the second time period is from reception of a last one of the first data units that was received in order, to reception of a further data unit having a corresponding sequence number that is greater, by a predetermined offset, than the sequence number corresponding to the last one of the first data units that was received in order.

2. The method of claim 1, wherein the second data units are forwarded in the order they are received during the second time period.

3. The method of claim 1, wherein each second data unit, received during the second time period, is forwarded without waiting for reception of other second data units.

4. The method of claim 1, further comprising discarding any of the second data units that are received from the lower protocol layer after the end of the second time period.

5. The method of claim 1, wherein:
  the method further comprises buffering the first data units in order of their corresponding sequence numbers; and
  the first data units are forwarded in the order they are buffered.

6. The method of claim 1, wherein the communication protocol layer is a packet data convergence protocol (PDCP) layer.

7. The method of claim 1, wherein the duration of the second time period is based on a reordering capability of the higher layer.

8. The method of claim 1, further comprising initiating the first timer upon receiving a first data unit having a first sequence number that is greater than the one or more second sequence numbers.

9. The method of claim 1, further comprising initiating a second timer upon one of the following events:
- expiration of the first timer,
- initiation of the first timer, or
- receiving a first one of the second data units after expiration of the first timer;
- wherein the second time period is from initiation of the second timer to expiration of the second timer.

10. The method of claim 1, further comprising:
- upon expiration of the first timer, retaining a current position of a lower end of a receiving window for data units from the lower layer; and
- at the end of the second period, increasing the lower end of the receiving window to a sequence number greater than the current position.

11. A network node configured to handle data units in a communication protocol layer of a wireless communications network, the network node comprising:
- at least one processor; and
- at least one memory storing computer-executable instructions that, when executed by the at least one processor, configure the network node to:
  - receive, from a lower protocol layer, one or more first data units with corresponding first sequence numbers;
  - upon expiration of a first timer, forward the first data units to a higher protocol layer without receiving one or more second data units, from the lower protocol layer, with corresponding second sequence numbers that are lower than the first sequence numbers; and
  - forward, to the higher protocol layer, any of the second data units that were received from the lower protocol layer during a second time period after expiration of the first timer,
    - wherein the second time period is from reception of a last one of the first data units that was received in order, until reception of a further data unit having a corresponding sequence number that is greater, by a predetermined offset, than the sequence number corresponding to the last one of the first data units that was received in order.

12. The network node of claim 11, wherein the second data units are forwarded in the order they are received during the second time period.

13. The network node of claim 11, wherein each second data unit, received during the second time period, is forwarded without waiting for reception of other second data units.

14. The network node of claim 11, wherein execution of the instructions further configures the network node to discard any of the second data units that are received from the lower protocol layer after the end of the second time period.

15. The network node of claim 11, wherein execution of the instructions further configures the network node to:
- buffer the first data units in order of their corresponding sequence numbers; and
- forward the first data units in the order they are buffered.

16. The network node of claim 11, wherein the communication protocol layer is a packet data convergence protocol (PDCP) layer.

17. The network node of claim 11, wherein the duration of the second time period is based on a reordering capability of the higher layer.

18. The network node of claim 11, wherein execution of the instructions further configures the network node to initiate the first timer upon receiving a first data unit having a first sequence number that is greater than the one or more second sequence numbers.

19. The network node of claim 11, wherein execution of the instructions further configures the network node to initiate a second timer upon one of the following events:
- expiration of the first timer,
- initiation of the first timer, or
- receiving a first one of the second data units after expiration of the first timer;
- wherein the second time period is from initiation of the second timer until expiration of the second timer.

20. The network node of claim 11, wherein execution of the instructions further configures the network node to:
- upon expiration of the first timer, retain a current position of a lower end of a receiving window for data units from the lower layer; and
- at the end of the second period, increase the lower end of the receiving window to a sequence number greater than the current position.

21. A non-transitory computer-readable medium storing computer-executable instructions that, when executed by at least one processor comprising a network node, causes the network node to perform operations, the operations comprising:
- receiving, from a lower protocol layer, one or more first data units with corresponding first sequence numbers;
- upon expiration of a first timer, forwarding the first data units to a higher protocol layer without receiving one or more second data units, from the lower protocol layer, with corresponding second sequence numbers that are lower than the first sequence numbers; and
- forwarding, to the higher protocol layer, any of the second data units that were received from the lower protocol layer during a second time period after expiration of the first timer,
  - wherein the second time period is from reception of a last one of the first data units that was received in order, until reception of a further data unit having a corresponding sequence number that is greater, by a predetermined offset, than the sequence number corresponding to the last one of the first data units that was received in order.

* * * * *